W. N. BARTHOLOMEW.
Improvement in Slate Frames.
No. 116,139.
Patented June 20, 1871.
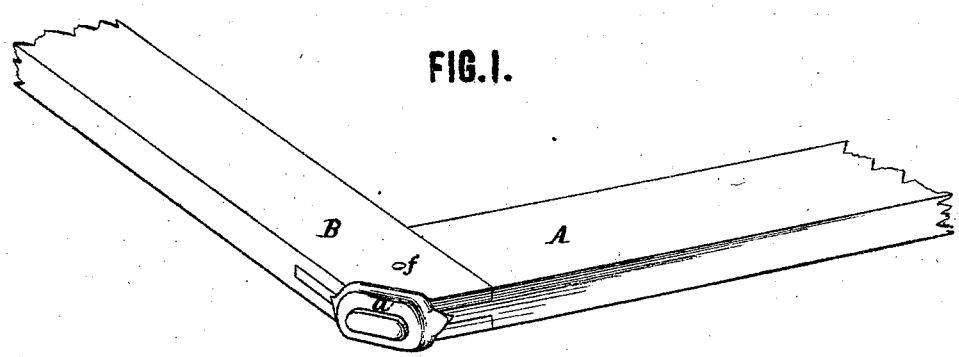
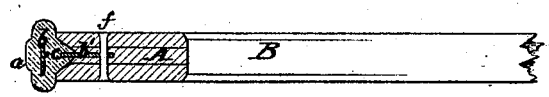
 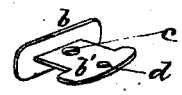

UNITED STATES PATENT OFFICE.

WILLIAM N. BARTHOLOMEW, OF NEWTON CENTRE, MASSACHUSETTS.

IMPROVEMENT IN SLATE-FRAMES.

Specification forming part of Letters Patent No. 116,139, dated June 20, 1871.

*To all whom it may concern:*

Be it known that I, WILLIAM N. BARTHOLOMEW, of Newton Centre, in the county of Middlesex and State of Massachusetts, have invented certain new and useful Improvements in Elastic Corners for Slate-Frames, of which the following is a specification:

My present invention may, in some respects, be considered as an improvement on that for which Letters Patent No. 100,712 were issued to me on the 15th March, 1870.

My object now is to provide for the vulcanized rubber a metallic supporting-plate, which will give more firmness to the exposed edges of the rubber and hold them in their place, keeping them from bending outward or from being crushed by the weight applied to the slate-frame when it is in use; and a further object I have in view is to connect the elastic corner composed of the rubber and its supporting-plate with the slate-frame more firmly and securely than has heretofore been practicable, using the same pin which unites the two adjoining pieces of the frame at any one corner of the slate to also fasten in place the elastic corner.

The manner in which my invention is or may be carried into effect will be readily understood by reference to the accompanying drawing, in which—

Figure 1 is a view of a portion of a slate-frame provided with an elastic corner made in accordance with my invention. Fig. 2 is a transverse section in a vertical plane passing through the center of the elastic corner and the rivet that holds it in place. Fig. 3 is a perspective view of the elastic corner detached. Fig. 4 is a like view of the metallic supporting-plate with the rubber removed.

The elastic corner is composed of the rubber $a$ and the metallic supporting-plate $b\ b'$. The latter is formed as shown in Fig. 4, having substantially a T-shape, the shank $b'$ being perpendicular to the plane of the head $b$. Both the shank and head are formed of flat plates, which may either be struck up in one piece or otherwise formed and put together. I do not, of course, limit myself to the precise form shown of the two pieces, as this may be varied to some extent. The head portion of the holding-plate will vary in size and shape with the size and shape of the rubber which is applied to it, keeping in view the object above stated. One or more holes, $c$, may be formed in the head or in that part of the shank covered by the rubber to enable the latter to take a firmer hold on the plate; or the head or upper portion of the shank, or both, may be roughened, scored, indented, or equivalently formed, to enable the rubber to hold better. In the lower part of the shank is formed a hole, $d$, for the passage of the rivet or pin which binds the corner of the slate-frame. The rubber $a$ is composed of a vulcanizable compound, which is applied to the metallic supporting-plate while in the green or plastic state, and is then united therewith by vulcanization. The outer portion of the rubber head may be formed as shown in the drawing, or it may be semi-cylindrical in cross-section, or it may have any other shape which is found suitable. The under portion of the rubber, or that part around the shank and in contact with the slate-frame, I prefer to make wedge-shaped, as shown, in order to fit in a groove of corresponding form made in the corner of the slate-frame. This portion of the rubber may, however, be otherwise shaped, if desired. In order to fasten the elastic corner to the slate-frame, I form in the corner of the slate-frame a slot in a plane about parallel with the slate, the upper portion of this slot being widened to form the groove above referred to. The shank $b'$ of the metallic holding-plate is inserted in this slot, the rubber corner is pressed down until its under part enters the groove, and then the metallic rivet or pin $f$ is driven through the two dovetailed ends A B of the frame, passing also through the hole $d$ in the shank $b'$. The ends of the rivet are then upset to prevent it from being punched out, and the elastic corner is thus firmly fastened, the pin which holds it serving also to unite the two ends of the slate-frame which meet at the corner.

Having described my invention, and the manner in which the same is or may be carried into effect, what I claim, and desire to secure by Letters Patent, is—

1. An elastic corner for slate-frames, composed of a metallic supporting and holding plate, made substantially as described, and a vulcanized-rubber head placed upon the said plate while in the green or plastic state, and then united therewith by vulcanization, as set forth.

2. The combination of an elastic corner, made as described, with the corner of a slate-frame, the shank of the holding-plate being let into the frame, and the two being united by the same rivet which fastens together the adjoining ends of the frame, substantially as shown and set forth.

In testimony whereof I have signed my name to this specification before two subscribing witnesses.

WM. N. BARTHOLOMEW.

Witnesses:
JAMES F. HYDE,
JAMES H. HOWARD.